United States Patent Office.

JOHN P. VINSONHELLER, OF URBANA, OHIO.

Letters Patent No. 67,385, dated July 30, 1867.

---

IMPROVED PAINT.

---

*The Schedule referred to in these Letters Patent and making part of the same.*

---

TO ALL WHOM IT MAY CONCERN:

Be it known that I, JOHN P. VINSONHELLER, of the city of Urbana, of the county of Champaign, and State of Ohio, have invented a new kind of paint, suitable to either brick, stone, or wood-work, which I denominate Lime Paint, the composition of which is as follows, viz:

First, dissolve one bushel of lime in water, as if for common whitewash; second, add five pounds of any pigment not made of lead, and which has no trace of lead in its composition; third, add five pounds of copperas thoroughly dissolved in either hot or cold water.

All these ingredients must be thoroughly mixed. This mixture is then applied to any stone, brick, or wooden surface with a common whitewash brush. In the case of a wooden surface, after the coating shall have become dry, it will be necessary to apply with a paint-brush a mixture of one gallon of oil with one pint of Japan drying.

Pigments made from lead may be used by first boiling them in a bag and mingling the expressed juice with the lime and copperas, as in the case of pigments not made of lead The above colors can be shaded to any degree desirable by a subsequent application with a paint-brush of logwood dissolved in water. Upon brick and stone the cost of the paint will be but little more than that of common whitewash. The subsequent application of oil and drying in the case of wood-work will raise the cost to about one-third of that of oil painting.

What I claim as my invention, and desire to secure by Letters Patent, is—

The fixing of the color of any pigment that may be used, by its combination with lime and copperas, as and for the purpose described.

J. P. VINSONHELLER.

Witnesses:
    E. C. MERRICK,
    F. M. HEATON.